United States Patent [19]

Baker

[11] 4,103,561
[45] Aug. 1, 1978

[54] VEHICLE WITH IMPROVED STEERING SYSTEM

[75] Inventor: Donald C. Baker, Rosedale, Ind.

[73] Assignee: J. I. Case Company, Racine, Wis.

[21] Appl. No.: 783,164

[22] Filed: Mar. 31, 1977

[51] Int. Cl.² .................. B62D 1/04; F16D 31/02
[52] U.S. Cl. .................................. 74/552; 60/384
[58] Field of Search .................... 74/552, 553, 557

[56] References Cited

U.S. PATENT DOCUMENTS

| | | | |
|---|---|---|---|
| 2,968,969 | 1/1961 | Henning | 74/557 X |
| 3,707,887 | 1/1973 | Day | 74/552 |
| 3,959,968 | 6/1976 | Greiner | 60/384 |

Primary Examiner—Leonard H. Gerin
Attorney, Agent, or Firm—Dressler, Goldsmith, Clement, Gordon & Shore, Ltd.

[57] ABSTRACT

A method and apparatus for reducing shock loads to an operator of a vehicle during turning movement is disclosed herein. The method consists of increasing the mass of an actuator connected to a control element which controls flow of hydraulic fluid to a fluid motor that produces turning movement for the vehicle. The increased mass is spaced from the fixed rotational axis for the actuator which results in an increased moment of inertia for the actuator that resists acceleration and deceleration of the actuator thereby resisting rapid changes in turning movements for the vehicle.

14 Claims, 7 Drawing Figures

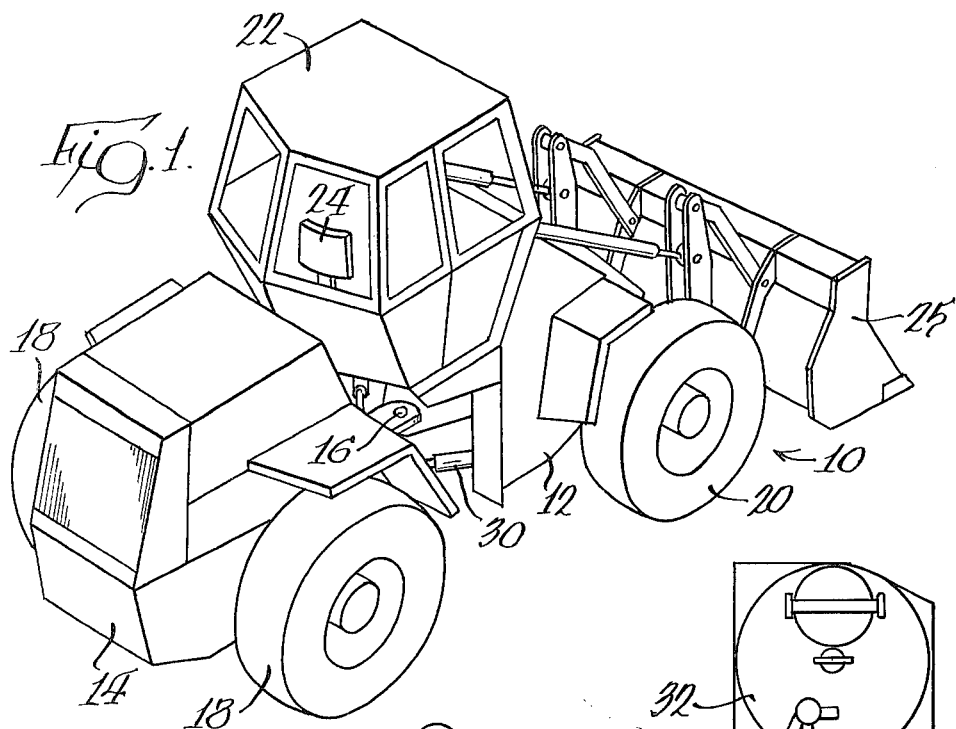
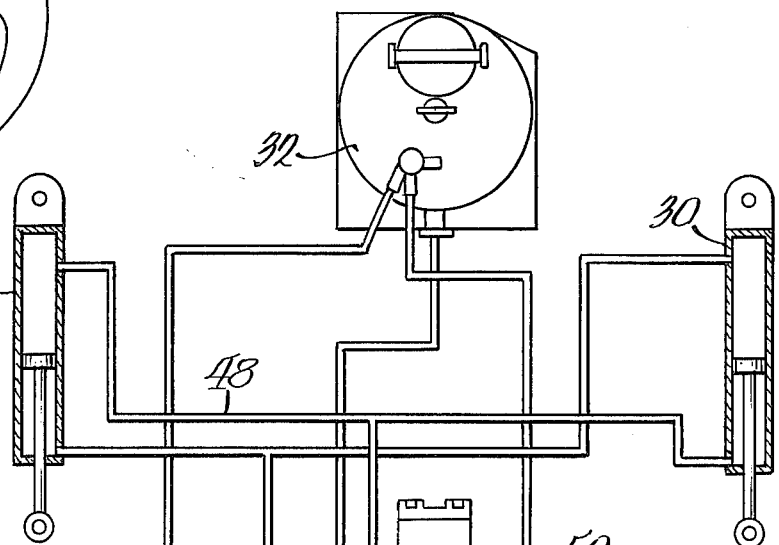
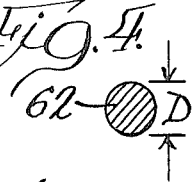
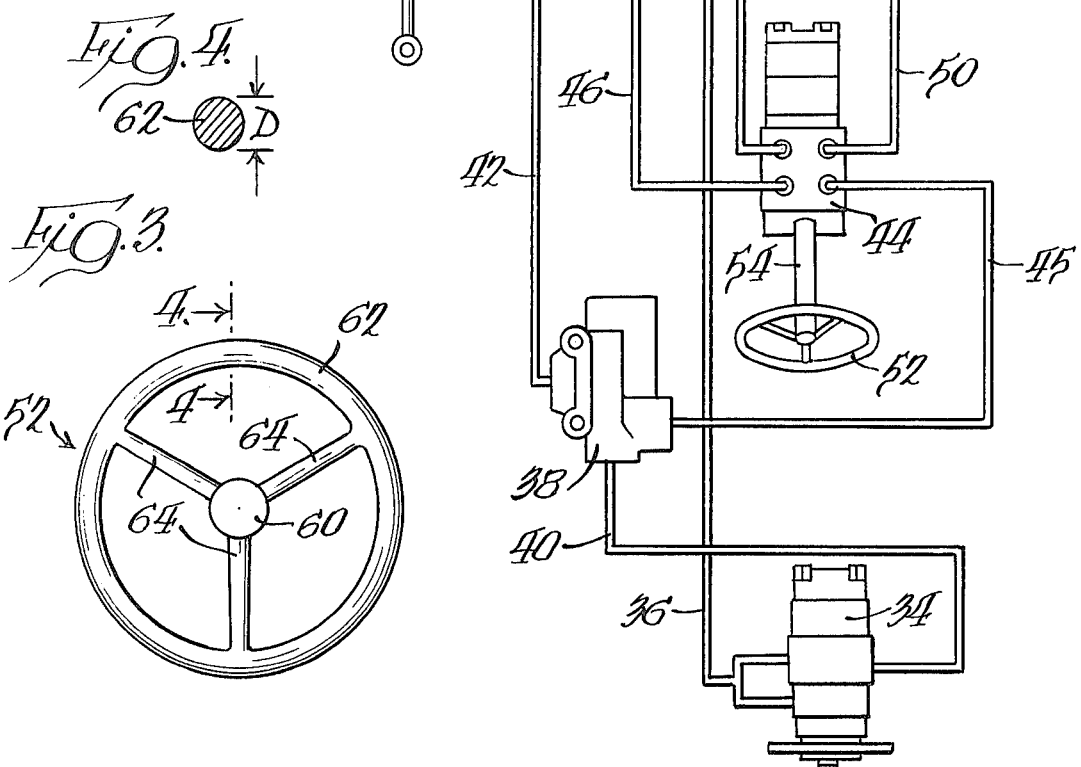

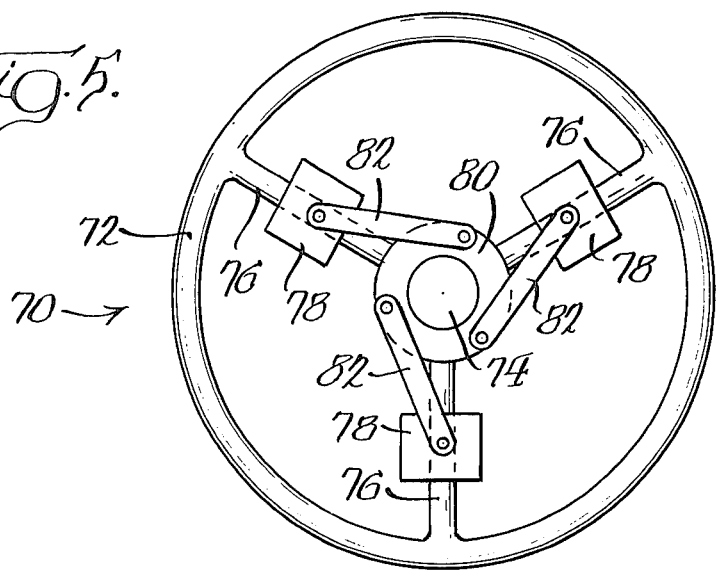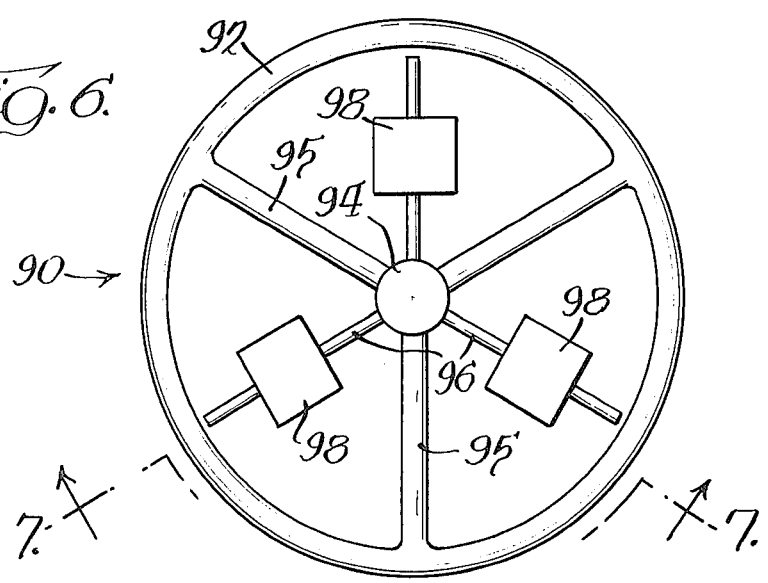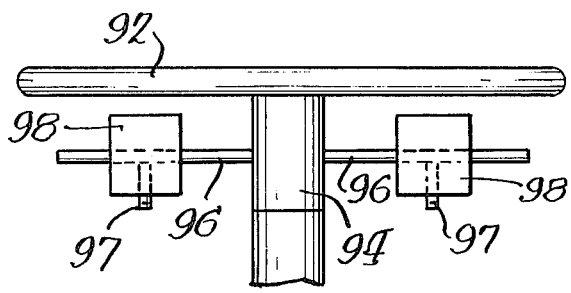

VEHICLE WITH IMPROVED STEERING SYSTEM

BACKGROUND OF THE INVENTION

The present invention relates generally to vehicles and more particularly to heavy duty industrial vehicles utilized as earthmoving equipment.

One type of vehicle that has been used extensively in large earthmoving equipment is known as an articulated vehicle. This articulated vehicle consists of two vehicle sections that are pivotally interconnected through a vertical pivot and the sections are pivoted relative to each other through hydraulic fluid motor means to control the turning movements for the vehicle. One type of steering system for producing the turning movements includes hydraulic rams which are pivotally connected between the respective frame sections and actuation of the rams will produce relative angular movement of one frame section with respect to the other frame thereby steering the vehicle. The most common steering system that has been utilized in articulated vehicles includes a conventional steering wheel attached to a steering column with a steering valve operated by the steering column. The steering valve in turn controls the flow of hydraulic fluid to and from a pair of hydraulic fluid rams that define the hydraulic motor means with the rams pivotally connected to the respective sections.

One type of commercial vehicle that is presently available is a Model W24B articulated loader that is being marketed by the assignee of the present invention. Because of the size of such a vehicle, which is used as heavy construction and earthmoving equipment, the fluid rams must be provided with sufficiently high input flow rates and pressure to provide the required steering system response for the articulated vehicle. However, this has presented some problems in the operation of the unit. One particular problem that has been pinpointed is the fact that with the large required flow rate of the hydraulic fluid in a system of this type, undesirable vibrations can be unexpectedly developed when steering is initiated or terminated.

In commercial heavy duty earthmoving equipment of the type mentioned above, the operator is seated on either the forward or rear section of the vehicle and is spaced from the pivotal point of that section (the axle) by a substantial distance. Thus, during turning movements of the vehicle, the operator's seat is actually laterally shifted when the vehicle changes direction.

It has been found that hydrostatic steering systems of the type incorporated into existing vehicles are capable of being actuated and neutralized very rapidly which results in what is referred to as "jerk" experienced by the operator.

This problem of "jerkiness" experienced by the operator becomes even more acute when the articulated vehicle is being transported at high rates of speed. It has been found that when a vehicle is travelling at a high rate of speed and encounters extremely rough terrain, such as railroad tracks on highways, it is extremely difficult for the operator to prevent inadvertent actuation of the steering system in opposite directions almost instantaneously which results in a swaying motion of the operator's seat in opposite directions.

Various attempts have been made to reduce the "jerk" experienced by the operator when a steering system is activated or neutralized, and examples of the prior attempts were primarily involved in the hydraulic system for the steering mechanism. Examples of such devices are time delayed devices, cross-over relief valves, pressure compensating valves and dumping valves incorporated into the hydraulic circuit for the steering system. One example of a prior attempt to minimize the "jerk" problem is disclosed in U.S. Pat. No. 3,959,968 which discusses the particular problem in terms of vibratory instability in the motion of a vehicle during turning movement. This patent proposes the solution in the form of a dampener associated with the steering valve that forms part of the hydrostatic circuit.

SUMMARY OF THE INVENTION

According to the present invention, the "jerkiness" experienced by the operator when seated on an articulated vehicle is minimized in an extremely simple manner which does not affect the steering control by the operator.

More specifically, the shock loads experienced by an operator on a vehicle and resulting from directional changes for the vehicle are minimized by incorporating a large mass into the steering actuator so that the rate of acceleration and deceleration of the actuator about a fixed axis is resisted by the large moment of inertia that is developed by the mass associated with the actuator.

In one specific embodiment of the invention, a standard steering wheel for an articulated vehicle is modified to increase the mass of the rim for the wheel thereby increasing the moment of inertia for the steering wheel or actuator so that a predetermined force that would normally be applied by an operator produces less movement or lower acceleration of the actuator when compared to present day existing steering wheels associated with articulated vehicles.

According to another aspect of the invention, the mass associated with the actuator is adjustable with respect to the center of rotation thereby giving the operator the ability to set the steering mechanism to fit his own needs.

BRIEF DESCRIPTION OF THE SEVERAL VIEWS OF THE DRAWINGS

FIG. 1 shows an articulated vehicle having the present invention incorporated therein;

FIG. 2 is a schematic illustration of the steering system for the articulated vehicle shown in FIG. 1;

FIG. 3 is a plan view of the actuator or steering wheel;

FIG. 4 is a sectional view as viewed along line 4—4 of FIG. 3;

FIG. 5 is a view similar to FIG. 3 showing a slightly modified form of the invention; and FIG. 6 is a view similar to FIG. 3 showing a further modified form of the invention;

FIG. 7 is a side view, as viewed along line 7—7 of FIG. 6.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

FIG. 1 of the drawings discloses an articulated vehicle generally designated by reference numeral 10 and including a forward frame section 12 and a rear frame section 14 pivotally interconnected for relative movement about a vertical axis defined by pivot pin 16. Rear frame section is supported by a pair of wheels 18 that are mounted on an axle (not shown), the vertical center line of which defines a vertical reference pivot axis for the rear section. Rear frame section 14 houses an engine and other components for propelling the vehicle and performing other control functions.

Likewise, forward section 12 is supported by a pair of wheels 20 which are supported on an axle that is connected to the forward frame section, the vertical center line of which defines a reference pivot axis for the forward section 12. Forward section 12 also has an operator's station 22 with an operator's seat 24 located therein and the seat is spaced from the reference pivot axis. A material handling unit 25 is pivotally supported at the forward end of the forward or front section.

As indicated above, the turning movement or directional control for the vehicle is performed through a pair of fluid rams 30 that define hydraulic motor means and which are interposed between the front and rear frame sections 12 and 14. FIG. 2 of the drawings discloses a steering system for controlling the flow of hydraulic fluid to the respective fluid rams 30 and includes a reservoir 32 connected to a hydraulic pump 34 through a conduit 36. The output of pump 34 is connected to a flow control valve 38 through a conduit 40 and flow control valve is connected to reservoir 32 through a conduit 42. Flow control valve 38 is also connected to an inlet port of a conventional power steering valve 44 through a conduit 45. Steering or control valve 44 has two outlet ports that are respectively connected to the opposite ends of the cylinders that form part of fluid rams 30 through conduits 46 and 48 while a return port is connected to reservoir 32 through a conduit 50.

Steering valve 44 has a valve spool or control element (not shown) that is moved through an actuator or steering wheel 52 connected thereto through a steering column 54 so that axial shifting of the valve spool within the valve housing of steering valve 14 will connect inlet conduit 45 to either of conduits 46 or 48 while the other conduit is connected to the reservoir through conduit 50. The steering system so far described is a well known system that is incorporated into a Model W24B articulated loader manufactured and sold by the assignee of the present invention.

When hydraulic fluid is supplied to the cylinders of fluid rams or motor means 30, the respective sections pivot about pivot pin 16 and the reference points for this pivotal movement are the respective connections for the axles of the respective sections. In other words, when a turning movement is initiated, the pivotal connection 16 will actually be shifted laterally to one side or the other to change the angular orientation of the respective frame sections with respect to each other.

As indicated above, in large heavy duty equipment of this type, it is essential that pump 34 have the capability of providing a large volume of flow at high pressures to the respective steering fluid rams to handle the heavy weight of the vehicle and provide sufficient steering speed for pivoting the sections with respect to each other. However, this creates problems in initiation and termination of the steering or directional changes for the vehicle. Because of the efficiency of the overall steering system disclosed herein, the control element or spool that forms part of steering valve 40 can be rapidly moved to a fully open position in a very short increment of time. This allows the entire volume of flow from flow control valve 38 to accelerate the fluid rams 30 to maximum velocity in this same short time increment and results in rapid angular acceleration of the frame sections about their perspective pivotal points. Because the operator's seat 24 is located a substantial longitudinal distance from the pivot point for forward frame section 12, and thus is in close proximity to the pivotal connection 16 between the frame sections, the rapid acceleration of this frame section not only introduces shock loads into the structure for the vehicle, but also results in rapid lateral acceleration of the operator's seat 24 and the operator therefore receives extreme lateral shock loads or forces during initiation and termination of a turning movement.

This lateral "jerky" motion experienced by the operator has been incorporated into vehicles of this type for at least the last decade and experienced operators have learned that reducing the acceleration of the steering wheel to the desired steering speed reduces the undesired shock load experienced by the operator.

It has been determined that "jerk" experienced by the operator can in large measure be attributed to the development of materials utilized for producing the steering wheel. More specifically, the development of durable plastics as substitutes for metals, such as steel, has resulted in very lightweight steering wheels. The use of these lightweight steering wheels with a hydrostatic steering system of the type discussed above gives the operator the capability of rapidly moving the valve spool of steering valve 44 from a neutral position to a full flow position.

Applicant has determined that the "jerk" experienced by an operator can be substantially reduced by incorporating physical restrictions into the steering system so that the actuator cannot be rapidly accelerated or decelerated.

According to the present invention, the induced shock loads experienced by the operator and the vehicle are substantially reduced by restricting the acceleration of the steering wheel or actuator when a given input torque or force is applied to the actuator by the operator. This is accomplished by providing a large mass for the actuator and positioning the large mass at a location spaced from the fixed rotational axis (the steering column 54) to produce a large moment of inertia so that an input force normally applied by an operator produces lower acceleration of the actuator when compared to a conventional actuator.

More specifically, in the embodiment illustrated in FIGS. 3 and 4, the shock loads experienced by an operator on a vehicle resulting from rapid directional changes for the vehicle that produce lateral forces on the operator are reduced by increasing the mass of the actuator to prevent rapid acceleration and deceleration of the actuator thereby resisting sudden directional changes for the vehicle for a given input force that is normally applied by an operator for producing directional changes in the vehicle. More specifically, in the embodiment illustrated in FIGS. 3 and 4, the actuator or steering wheel 52 consists of a central hub 60 and a rim 62 that is connected to hub 60 through spokes 64.

In the specific embodiment of the invention actually tested, rim 62 was made from approximately a one inch steel rod and the diameter of the rim was 17 inches. Utilizing a density factor for steel of 0.283 lbs./in$^3$ and ignoring the mass of the spokes 64, the moment of inertia of the steering wheel or actuator constructed in accordance with the present invention was calculated to be approximately 880 lb.in.² These calculations were verified experimentally by measuring the moment of inertia of the steering wheel using the torsional pendulum principle.

In order to place this calculation in proper perspective, a comparison was made with a present commercial steering wheel utilized in an articulated vehicle by the assignee of the present invention and designated as a standard wheel identified as Part No. L47502. This standard steering wheel has a rim consisting of a center steel core having a diameter of 0.44 inches with a surrounding butylate material having a diameter of 1.06 inches and the rim is connected to the hub through three spokes which defines a radius of gyration of approximately 8.5 inches for the mass of the rim. Utilizing a density for butylate of 0.043 lbs./in³, the total moment of inertia for a standard steering wheel was calculated to be about 285 lb.in².

Comparing these two figures it will be noted that the moment of inertia for the steering wheel or actuator constructed in accordance with the teachings of the present invention is more than three times that of a conventional steering wheel that is presently being utilized by the assignee of the present invention on articulated vehicles of this type.

Actual tests were conducted utilizing various operators for comparison tests between a present standard steering wheel and the steering wheel having the larger mass. The results showed that the operators unanimously agreed that the "jerkiness" experienced by the operator was substantially reduced due to the larger mass in the new steering wheel.

Another comparison that can be made between the present day standard steering wheel and the steering wheel with increased mass is the ratio of the moment of inertia and the radius of gyration of the mass of the steering wheel. The radius of gyration of the mass of the rim of the standard steering wheel referred to above is approximately 8.5 inches and the moment of inertia, as indicated above, is 285 lb.in² so that the moment of inertia is approximately 33 times the value of the radius of gyration for the mass of the rim. In the specific example of the steering wheel of greater mass discussed above, the moment of inertia is more than 100 times the value of the radius of gyration so that initiation of rotation and interruption of rotation of the wheel is initially resisted by the large mass and the wheel thereby acts as a shock dampener to prevent rapid changes in directional movement of the articulated frame sections with respect to each other.

While the minimum ratio of the moment of inertia with respect to the radius of gyration cannot be accurately determined, it is believed to be desirable that this ratio be more than 50.

Stated another way, when the same input force which is normally applied by an operator to a steering wheel or actuator (approximated to be about an average of 30 lbs.) is applied to the steering wheel having the large mass in accordance with the teachings of the present invention, the input force will produce less angular movement or displacement of the actuator with respect to its rotational axis for a given time period than the same force would produce on a standard or conventional actuator or steering wheel.

Summarizing the broadest aspect of the present invention, shock loads or reaction forces that are experienced by an operator of an articulated loader resulting from rapid directional changes of the vehicle that produce lateral forces on the operator are substantially reduced by providing a large mass that is associated with the actuator and positioning the mass at a location spaced from the axis of rotation of the actuator to resist rapid acceleration and deceleration of the actuator thereby resisting sudden directional changes for the vehicle when the same force is applied as is now normally applied to a conventional actuator or steering wheel.

A slightly modified form of actuator is disclosed in FIG. 5 which has the capability of readily varying the moment of inertia for an actuator to obtain the desired operating characteristics for a given steering system, also taking into account the particular operator that is controlling the vehicle. In the embodiment illustrated in FIG. 5, steering wheel 70 includes a rim 72 connected to a center hub 74 by a plurality of spokes 76. Each of the spokes has a weight or mass 78 slidably supported thereon and weights 78 are adapted to be shifted inwardly and outwardly through a rotational control element 80 that is connected to the respective weights through links 82. In this embodiment, the steering wheel 70 could be a conventional standard existing steering wheel which would be modified to incorporate the mass 78 and control member 80 along with links 82. It will be appreciated that with the embodiment illustrated in FIG. 5, the radius of gyration for mass 78 with respect to hub 74 can readily be varied by rotating control member 80 so as to change the moment of inertia for the actuator. Once the desired positional setting has been obtained, the control member could then be releasably secured to hub 74 so that mass 78 and rim 72 move as a unit.

A slightly further modifed form of the invention is illustrated in FIGS. 6 and 7 and is in many respects similar to the embodiment illustrated in FIG. 5. In the embodiment illustrated in FIGS. 6 and 7, steering wheel 90 includes a rim 92 that is connected to a hub 94 through spokes 95. Directly below steering wheel 90, hub 94 has a plurality of circumferentially spaced rods 96 that extend radially outward and each supports a weight or mass 98 that is releasably retained on rod 96 through set screw 97.

The embodiment illustrated in FIGS. 6 and 7 again can adjust the respective masses or weights 98 to obtain an optimum resistance to acceleration and deceleration of actuator 90 for any given vehicle. An additional advantage of the embodiment illustrated in FIGS. 6 and 7 is the fact that the weights and rods could be located below the control console for the operator's cabs so as to be hidden from view and would not obstruct the vision of the operator since a standard steering wheel could be utilized.

What is claimed is:

1. The method of reducing lateral reaction forces applied to an operator of a vehicle as a result of rapid directional changes for said vehicle by restricting the acceleration and deceleration of an actuator that moves a control element which controls directional changes of a vehicle with the actuator being moved about an axis of rotation, comprising: providing a large mass associated with said actuator and spacing said large mass from said axis of rotation to produce a large moment of inertia for said actuator thereby restricting the rate of acceleration and deceleration of said actuator when a given actuating force in a direction tangential to said axis of rotation is applied to said actuator by an operator.

2. The method as defined in claim 1, in which said actuator includes a rim surrounding said axis of rotation and spokes extending inwardly from said rim to said axis of rotation and in which said large mass is incorporated into said rim.

3. The method as defined in claim 1, in which said moment of inertia is varied by adjusting said mass with respect to said axis of rotation.

4. The method as defined in claim 1, in which said vehicle is an articulated vehicle having forward and rear sections pivotally interconnected and said directional changes are produced by pivoting said sections relative to each other.

5. A method of reducing shock loads on an operator seated on one frame section of an articulated vehicle having front and rear frame sections pivotally interconnected about a vertical pivot and each section supported by wheels so that directional changes can be made by pivoting said sections about said vertical pivot through hydraulic motor means which results in lateral shifting of said vertical pivot between said wheels thereby producing lateral movement to the operator, and in which control of hydraulic fluid to said motor means includes a movable control element connected to an actuator which is moved about a fixed axis, comprising: providing a large mass for said actuator, and positioning said large mass at a location spaced from said axis for movement therewith so that said actuator has a large moment of inertia sufficient to resist instantaneous directional changes for said vehicle thereby minimizing the lateral acceleration and deceleration of said operator between said wheels.

6. A method of reducing shock loads received by an operator on a vehicle resulting from rapid directional changes for the vehicle that produces lateral forces on the operator, said vehicle having a steering system including an actuator having a given mass rotated about an axis of rotation and a control element connected to the actuator and moved in response to rotation of the actuator to supply hydraulic fluid to motor means, and produce directional changes for the vehicle comprising providing a large additional mass for said steering system, supporting said large additional mass for rotation about said axis of rotation with said actuator, and changing the position of said large additional mass with respect to said axis of rotation to change the moment of inertia of said actuator.

7. The method of controlling the rate of acceleration and deceleration of an actuator rotated about a fixed axis and connected to a movable control element which controls pressurized hydraulic fluid flow to fluid motor means that produce turning movements for a vehicle, comprising the steps of providing a large mass for said actuator and positioning said large mass at a location spaced from said fixed axis to produce a large moment of inertia for said actuator so that an input force normally applied by an operator produces lower acceleration of the actuator when compared to a conventional actuator.

8. In an articulated vehicle having a forward section and a rear section pivotally interconnected for relative movement about a vertical pivot, hydraulic motor means connected to the respective sections for pivoting said sections about said vertical pivot, a pressurized fluid source, a control member actuatable to supply pressurized fluid from said source to said hydraulic motor means and an actuator movable about a fixed rotational axis and connected to said control member for actuating said control member, the improvement comprising means within said actuator providing increased mass spaced from said rotational axis for producing increased moment of inertia for said actuator so that a normal input force normally applied to said actuator by an operator will gradually accelerate said pivotal movement of said sections relative to each other and thereby reduce the lateral jerky motion to the operator that is spaced from a reference pivot point for a section having an operator's seat thereon.

9. An articulated vehicle as defined in claim 8, in which said actuator includes a hub rotated about said rotational axis with a rim surrounding said hub and spokes connecting said rim to said hub and in which said increased mass is in said rim.

10. An articulated vehicle as defined in claim 8, in which said mass within said actuator includes support means rotatable with said actuator, weights on said support means, and means accommodating adjustment of said weights on said support mass to vary said moment of inertia.

11. In a steering system for a vehicle including an actuator of a given mass moved about a fixed axis and connected to a control element which controls flow of hydraulic fluid to motor means to produce direction changes in said vehicle, the improvement comprising means providing additional mass for said actuator and support means on said actuator for adjustably supporting said additional mass with respect to said fixed axis so that the moment of inertia for said actuator can be varied by movement of said additional mass with respect to said fixed axis.

12. A steering system as defined in claim 11, in which said actuator is a steering wheel having a hub on said fixed axis with a rim surrounding said hub and spokes connecting said hub to said rim and in which said means providing additional mass includes weights slidably supported on the respective spokes to define said support means.

13. A steering system as defined in claim 11, in which said actuator is a steering wheel and said support means includes rods rotatable about said fixed axis with said steering wheel and said additional mass includes weights slidably supported on said rods and releasably retained in adjusted positions.

14. In a steering wheel for use in controlling steering movements of an articulated vehicle comprising a hub adapted to be rotated about a fixed axis with a rim spaced from said hub by a fixed radius and connected to said hub by spokes, the improvement of means within said rim for producing a predetermined mass for said wheel such that the moment of inertia of said wheel about said axis is a quantity at least 50 times said radius whereby the mass of said wheel resists rapid rotational acceleration and deceleration about said axis when an average input torque is applied to said actuator by an operator.

* * * * *